US012807219B2

(12) United States Patent
Wilson-Jones

(10) Patent No.: US 12,807,219 B2
(45) Date of Patent: Nov. 24, 2026

(54) DUAL MOTOR DRIVE ASSEMBLY

(71) Applicant: ZF Automotive UK Limited, Solihull (GB)

(72) Inventor: Russell Wilson-Jones, Stratford upon Avon (GB)

(73) Assignee: ZF Automotive UK Limited, Solihull (GB)

(*) Notice: Subject to any disclaimer, the term of this patent is extended or adjusted under 35 U.S.C. 154(b) by 513 days.

(21) Appl. No.: 18/467,104

(22) Filed: Sep. 14, 2023

(65) Prior Publication Data

US 2024/0101188 A1 Mar. 28, 2024

(30) Foreign Application Priority Data

Sep. 16, 2022 (GB) ..................................... 2213636

(51) Int. Cl.

*B62D 5/04* (2006.01)
*B62D 1/04* (2006.01)
*B62D 5/00* (2006.01)

(52) U.S. Cl.

CPC ........... *B62D 5/049* (2013.01); *B62D 5/0409* (2013.01); *B62D 5/0463* (2013.01); *B62D 1/04* (2013.01); *B62D 5/006* (2013.01); *B62D 5/0403* (2013.01)

(58) Field of Classification Search

CPC ..................................... H02P 6/16; H02P 5/56
See application file for complete search history.

(56) References Cited

U.S. PATENT DOCUMENTS

2019/0367076 A1 12/2019 Kim
2019/0389504 A1 12/2019 Itoh
2022/0203519 A1* 6/2022 Overmyer ........ A61B 17/07207

FOREIGN PATENT DOCUMENTS

CN 113479258 A 10/2021
JP 2006306166 A 11/2006

* cited by examiner

*Primary Examiner* — Said Bouziane
(74) *Attorney, Agent, or Firm* — Kristin L. Murphy

(57) ABSTRACT

A dual-motor drive assembly comprising a housing, a shaft mounted to the housing, a first gear connected to the shaft, a first motor lane comprising motor an output, a motor drive-stage driving the first motor in response to a torque demand and applying a torque to the first gear, and a first position sensor generating a first motor position signal, a second motor lane comprising a motor having an output, a motor drive-stage driving the second motor in response to a torque demand, and applying a torque to the first gear, and a second position sensor generating a second motor signal, the two motor outputs engaging with the first gear such that both motors' torque output is applied to the shaft. A processor generates an estimate of the first motor position using the signal from the second sensor and the effect of any backlash in the assembly, and cross-checks first signal against the estimate to determine if one of the motor position sensors is faulty.

20 Claims, 16 Drawing Sheets

DUAL MOTOR DRIVE ASSEMBLY

CROSS-REFERENCE TO RELATED APPLICATION

This application claims priority to GB Priority Application No. 2213636.0, filed Sep. 16, 2022, the disclosure of which is incorporated herein by reference in its entirety.

TECHNICAL FIELD

This disclosure relates to a dual motor drive assembly, for example, but not exclusively, suitable for use in a handwheel actuator (HWA) assembly of a vehicle. The disclosure also relates to a method of operating a dual motor drive assembly whereby the correct functioning of one or more motor position sensors can be determined.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver moves and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor coupled to the steering wheel. The secondary motor provides the driver with the appropriate resistance and feedback in response to specific user inputs at the steering wheel to mimic the feel of a conventional steering system.

In a steer-by-wire system, a malfunction or failure of a portion of the assembly may impair the ability to steer the vehicle. As a result, it is desirable to provide the assembly with structure for providing at least temporary fan-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column. Having two motors allows some limited continuity of operation of the handwheel actuator if one of the motors is faulty.

GB 2579374 A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering column. As with US2006/0042858 A1 having two motors also provides for some redundancy in the system.

SUMMARY

In accordance with a first aspect of the present disclosure there is provided a dual motor drive assembly, for use in a handwheel actuator assembly of a vehicle, comprising:

- a housing;
- a shaft rotatably mounted with respect to the housing;
- a first gear connected to and configured to rotate with the shaft;
- a first motor lane comprising a first motor having an output, a motor drive stage which drives the first motor in response to a torque demand to cause the first motor output to apply a torque to the first gear, and a first motor position sensor that generates a first motor position signal indicative of an angular position of the first motor,
- a second motor lane comprising a second motor having an output, a motor drive stage which drives the second motor in response to a torque demand to cause the second motor to apply a respective torque to the first gear, and a second motor position sensor that generates a second motor position signal indicative of an angular position of the second motor,
- the two outputs of the motors being engaged with the first gear such that the torque output by both the first and second motors is applied to the shaft; and
- in which the assembly further comprises a processor that generates an estimate of the position of the first motor using at least the signal output from the second motor position sensor and taking account of an effect of any backlash in the assembly, and cross-checks the first motor position signal against the estimate of the motor position to determine if at least one of the motor position sensors is faulty.

The processor may generate an estimate of the shaft position that takes account of backlash in the gears connecting the second motor to the shaft, and the estimate of the first motor position derived from this shaft position estimate may take account of the backlash in the gears connecting the first motor to the shaft.

The estimate of the shaft position may further take account of the compliance in the assembly, for example, in the motor and gears of the two lanes.

The applicant has appreciated that one problem with a dual motor assembly is the need to measure the position of both motors, usually by providing a motor position sensor for each motor. Having two sensors doubles the chances of one sensor having a fault. For resilience it is important to determine whether a motor position is faulty so that the motor control is not performed incorrectly and remedial action can be taken.

The processor may comprise a first processing circuit that forms part of the first lane and a second processing circuit that forms part of the second lane. These two parts may be functionally independent so that a fault with one does not stop the correct functioning of the other. The second processing circuit may transmit information to the first processing circuit for use by the first processing circuit to generate the estimate of the position of the first motor.

The second processing circuit may transmit to the first processing circuit an estimate of the position of the shaft determined from the second motor position signal, the first processing circuit in turn determining an estimate of the first motor position from the estimate of the shaft position.

In an alternative to transmitting an estimate of shaft position, the second processing circuit may transmit to the first processing circuit the output of the second motor position sensor and a signal indicative of the torque applied to the shaft by the second motor. The first processing circuit may in turn estimate the first motor position by combining this information with a signal indicative of the torque applied to the shaft by the first motor. Knowing the two torques and information on the amount of backlash in the assembly the second motor position signal can provide a good estimate of the position of the first motor when the applied torques are also known.

Optionally, the processor may take account of any known angular position offset between the two motors when determining the estimate of the first motor position for use in the cross check.

In a further alternative, the second processing circuit may transmit only the output of the second motor position sensor to the first processing circuit and the estimate of first motor position may be performed by combining this with the demanded torque and difference between the two demand torques are used.

In one exemplary arrangement the exchange of signals between lanes is bi-directional and therefore the processor may generate an estimate of the position of the second motor using at least the motor position output from the first motor position sensor and cross-checks the second motor position signal against the estimate of the second motor position to determine if at least one of the motor position sensors is faulty.

Any reference in the previous paragraphs to information sent from the first lane to the second lane may be interchanged with reference to the equivalent information sent the other way from the second lane to the first lane. The same applies to any reference to processing performed by the first lane or the second lane.

The processor may be adapted to take account of any latency between the estimates of motor position and the measured motor positions due to time needed to transmit information across lanes and to generate the estimates of motor position.

In one arrangement, each lane may comprise two motor position sensors each independently producing a motor position signal. In this case, the processing means of each lane may be configured to cross-check its own two motor position sensors. If they do not match and are both plausible then the cross-check of motor position using estimates derived from the information exchanged between lanes set out here before may be employed to arbitrate and select which of the two sensors should be used for a degraded operating mode.

The assembly may include a motor controller which is arranged to allocate torque demands to the motor drive circuit of each of the first and second lanes to cause each motor to apply a respective torque to the first gear to cause the two motors to move across their respective gearbox backlash in synchronisation with performing a cross check of the output signals from the motor position sensors.

Undergoing the cross checks when moving through the backlash allows for a check to be made that an output from a motor position sensor is not frozen as it would be expected that the signals indicate the motors moving.

Furthermore, the cross check may comprise comparing the change in the motor position signals during the movement across the backlash to an expected change, and to flag an error if there is a mismatch. This is possible where the amount of backlash is known or can be estimated and hence the amount of expected movement is known.

The backlash of the respective gears for each motor may be stored in an electronic memory, for example when the assembly is produced or assembled. Alternatively, the backlash may be determined during the life of the assembly.

In one exemplary arrangement, each lane of the assembly may be adapted to actively allocate the torque to move the motor across the gearbox backlash when the shaft is stationary.

The processor of each lane may receive one or more signals that enable such conditions to be identified such as a measure from a yaw sensor of a vehicle or a vehicle velocity signal;

and a processor which is arranged to:

receive the angular position signals at a first time when the motor controller allocates a torque demand to the motors that produces a differential torque at the shaft having a first sense; the differential torque being sufficient to overcome friction between the gears and to ensure that any free play between the two output gears and the first gear is taken up;

receive the angular position signals at a second time when the motor controller allocates a torque demand to the motors that produces a differential torque at the shaft having a second, opposite sense, the differential torque being sufficient to overcome friction between the gears and to ensure that any free play between the two output gears and the first gear is taken up, and in which the processor is arranged to estimate the level of backlash in the gearbox as a function of the values of the angular position signals at the first and second times.

The processor may determine from the angular position signal the differential motion of the two motors between the first time and the second to estimate the backlash. Where there is zero backlash there will be no change in the differential motion at the two times. As backlash increases the differential motion will increase. The higher the backlash the more movement is needed on reversal of torque direction to go from the gears being fully meshed in one direction to fully meshed in the other as there is a greater amount of free play present. When free play is being taken up, there will be no transfer of torque from the motors to the output shaft through the gearbox.

The output of the two motors may connect to the first gear through a respective wormshaft. The backlash that is taken into account may comprise the backlash due to the meshing of these gears.

In accordance with a second aspect, the disclosure provides a dual motor drive assembly, for use in a handwheel actuator assembly of a vehicle, comprising:

a housing;

a shaft rotatably mounted with respect to the housing;

a first gear connected to and configured to rotate with the shaft;

first and second motors, each having an output driving a respective output gear, the output gears being engaged with the first gear;

a motor controller which allocates torque demands to each of the first and second motors to cause each motor to apply a respective torque to the first gear, a shaft position determining arrangement comprising a first motor position sensor arranged to determine a respective angular position signal indicative of the angular position of the first motor, a second motor position sensor arranged to determine the angular position of the second motor, and a processor which is arranged to generate a first estimate of the shaft position based on the angular position signal of the first motor position sensor and a second estimate of the shaft position based on the angular position of the second motor position sensor, the processor of the assembly further being arranged to cause the two motors to move across their respective gearbox backlash in synchronisation with a cross check of the output signals from the motor position sensors, and in which cross check takes account of any backlash in the connection of the motors to the shaft.

The motor controller may actively allocate the torque to each motor to provide a differential bias torque that moves the motor across the gearbox backlash when operating with a low output torque when the operating conditions permit. This is typically when there is a low or zero column movement and low net torque output from the two motors and to compare the first and second motor position signals to detect the differential movement of the motor position sensors under different directions of bias torque and to compare to a previously defined expected value.

The applicant has appreciated that moving the motors across the gearbox backlash will be generally imperceptible to a driver holding a handwheel attached to the shaft of the assembly and during this time the expectation would be for the motor position sensor output signals to change during that time. If a signal does not change an error may be flagged as this is likely a frozen signal. Similarly, if the output signal changes at an unexpected rate or by an unexpected amount an error may be raised.

The dual motor drive assembly may form part of a hand wheel actuator (HWA). The HWA may form part of a vehicle. A handwheel may be operably connected to the shaft.

The first gear may comprise a wormwheel gear. Each output gear may comprise a worm screw.

Backlash may be described as a clearance or lost motion in the assembly caused by gaps between the first gear and the output gears. With respect to the first gear and output gears, backlash may be defined as the amount of clearance between mated gear teeth.

The motor controller which allocates torque demands may comprise an electronic control unit. This may comprise any suitable controller, control unit or the like. The motor controller may also be configured to drive the motors during normal use of the dual motor assembly, or may be a stand-alone motor controller used for the estimation of backlash.

The motor controller may at the first time cause the motors to apply opposing torques that may be described as a positive differential torque. At the second time the opposing torques provided by the motors may be described as a negative differential torque.

The dual motor drive assembly may comprise a handwheel actuator assembly for a vehicle and the processor may arranged to estimate the level of backlash by observing the differential motion of the two motors during a period of operation with near-zero motion of the shaft. A handwheel or yoke is typically fixed to the shaft, and observing motion when the shaft is not rotating or near-zero will allow the estimate to be taken in an unobtrusive way without the handwheel moving or moving only a small amount.

The assembly of the second aspect may include any of the features of the assembly of the first aspect.

According to a third aspect of the disclosure there is provided a method of operating a dual motor drive assembly, for use in a handwheel actuator assembly of a vehicle, comprising:

a housing;

a shaft rotatably mounted with respect to the housing;

a first gear connected to and configured to rotate with the shaft;

a first motor lane comprising a first motor having an output, a motor drive stage which drives the first motor in response to a torque demand to cause the first motor output to apply a torque to the first gear, and a first motor position sensor that generates a first motor position signal indicative of the angular position of the first motor, a second motor lane comprising a second motor having an output, a motor drive stage which drives the second motor in response to a torque demand to cause the second motor to apply a respective torque to the first gear, and a second motor position sensor that generates a second motor position signal indicative of the angular position of the second motor, the two outputs of the motors being engaged with the first gear such that the torque output by both motors is applied to the shaft; and the two output gears being engaged with the first gear such that the torque output by both motors is applied to the shaft; and a processor; the method comprising:

generating an estimate of the position of the first motor using at least the signal output from the second motor position sensor and taking account of the effect of any backlash in the assembly; and cross-checking the first motor position signal against the estimate of the motor position to determine if at least one of the motor position sensors is faulty.

According to a fourth aspect of the disclosure there is provided a method of operating a dual motor drive assembly, for use in a handwheel actuator assembly of a vehicle, comprising:

a housing;

a shaft rotatably mounted with respect to the housing;

a first gear connected to and configured to rotate with the shaft;

a first motor lane comprising a first motor having an output, a motor drive stage which drives the first motor in response to a torque demand to cause the first motor output to apply a torque to the first gear, and a first motor position sensor that generates a first motor position signal indicative of the angular position of the first motor, a second motor lane comprising a second motor having an output, a motor drive stage which drives the second motor in response to a torque demand to cause the second motor to apply a respective torque to the first gear, and a second motor position sensor that generates a second motor position signal indicative of the angular position of the second motor, the two outputs of the motors being engaged with the first gear such that the torque output by both motors is applied to the shaft; and in which the assembly further comprises a processor that generates an estimate of the position of the first motor using at least the signal output from the second motor position sensor and cross-checks the first motor position signal against the estimate of the motor position to determine if at least one of the motor position sensors is faulty.

wherein the method comprises the following steps performed in the order listed:

a) deciding that the shaft is not required to move for a short period of time.

b) applying a differential torque to the shaft using the two motors such that one motor applies a torque in a first sense and the other applies a torque of the opposite sense;

c) measuring the position of the first motor using the first motor position sensor and measuring the position of the second motor using the second motor position sensor with the differential torque applied;

d) Ramping the differential torque applied by the two motors to the shaft from one polarity to the opposite polarity such that both motors have moved fully across any backlash in their respective connections to the shaft, e) measuring the position of the first motor using the first motor position sensor and measuring the position of the second motor using the second motor position sensor with the opposite polarity differential torque applied; and f) Confirming that the outputs of the two motor position sensors have changed by an expected amount according to the amount of backlash in each gearset, The method may further comprise after steps a to f the steps of:

g) Ramping the differential torque back to the original polarity h) Remeasuring the position of the first motor using the first motor position sensor and measuring the position of the second motor using the second motor position sensor; and h) Confirming that the output from the two motor position sensors have returned to their original values measured in step (c) (within expected tolerances) and if not flag that a fault is present in one or both to the motor position sensors.

BRIEF DESCRIPTION OF DRAWINGS

There will now be described by way of example only a number of exemplary arrangements of the disclosure with reference to the accompanying drawings of which.

DETAILED DESCRIPTION

In the following description, it is assumed that the MPS signal measures a motor shaft (mechanical) revolution and is accumulated from one revolution to another (e.g., after 2 shaft revolutions, the MPS measures 720°). The MPS will have an offset to the notional zero motor angle which will generally be set during assembly but can drift over time due to wear or damage to the assembly. Furthermore, the two motor shafts will have a mechanical offset to a nominal column zero angle. This again will be set during assembly and depend on the arrangement of any gearbox connecting the motor to the shaft as well as tolerances in the manufacturing of the motor itself. This offset will be a whole number of motor shaft rotations plus a partial motor shaft rotation.

The partial rotation will be calibrated at some end-of-line procedure and may be stored in non-volatile memory in the ECU. Alternatively, it may be learned and slowly adapted over the life of the unit.

It is also assumed that a measurement or estimate of the total backlash in the gearbox connecting the motors to the shaft is available.

Figure 1:
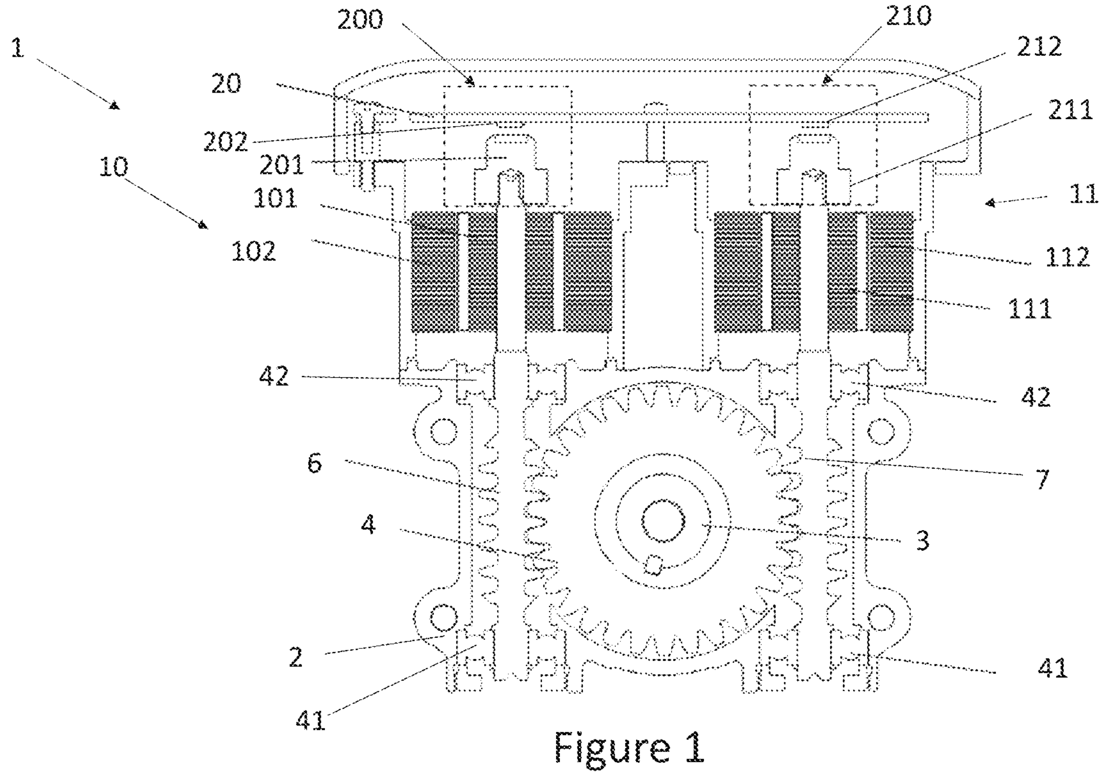
FIG. 1 shows an exemplary arrangement of a dual motor drive assembly according to a first aspect of the disclosure.

FIG. 1 shows a dual motor drive assembly, suitable for use in a handwheel actuator (HWA) assembly of a vehicle, according to a first aspect of the disclosure. The drive assembly 1 is configured as two fully independent motor lanes, Lane 1 and Lane 2. The first lane includes a first motor 10 with a rotor 101 and stator 102 and the second lane includes a second motor 11 with a rotor 111 and stator 112, the first motor 10 being connected to a first worm screw 6 and the second motor 11 being connected to a second worm screw 7. Each worm screw 6, 7 comprises a threaded shaft arranged to engage with a wormwheel gear 4 connected to a steering column shaft 3 such that torque may be transferred from the worm screws 6, 7 to the wormwheel gear 4 connected to the steering column shaft 3. The wormwheel gear 4 is operatively connected to a driver's handwheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm screws 6, 7 and the wheel gear 4 together form a dual motor electrical assembly.

Figure 4:
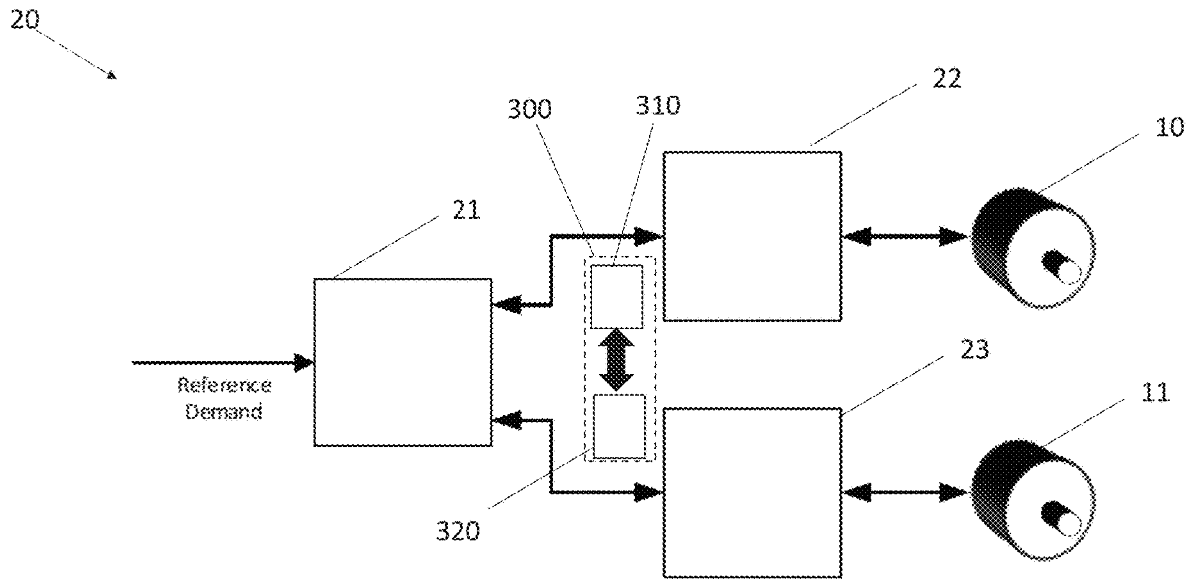
FIG. 4 shows a general arrangement of an electronic control unit which controls the two motors of a dual motor drive assembly according to a first aspect of the disclosure.

Each of the two motors 10, 11 are controlled by a respective motor drive circuit that receives a torque demand signal indicative of the torque that the motor is to apply—both the magnitude and the polarity of the torque to be applied. The torque demand signals in the embodiment of FIG. 4 are supplied by a shared controller 21 although this may also be split into two independent controllers with one in each lane. As shown the controller comprises an electronic control unit (ECU) 20. The ECU 20 controls the level of current applied to the windings and hence the level of torque that is produced by each motor 10, 11.

In this example, the two lanes and the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present embodiment) ameliorates the problems associated with use of a single motor. In this arrangement, both motors 10, 11 are controlled by the ECU 20 to provide torque feedback to the steering column and to ensure that the worm screws 6, 7 of both motors 10, 11 are continuously in contact with the wormwheel gear 4, to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm screw 6, 7 of each motor is supported relative to the housing by two sets of bearings. A first set of bearings 41 supports a first end of each worm screw 6, 7 distal their respective motor 10, 11 while a second set of bearings 42 supports a second end of each worm screw 6, 7 proximal their respective motor 10, 11.

Figure 2:
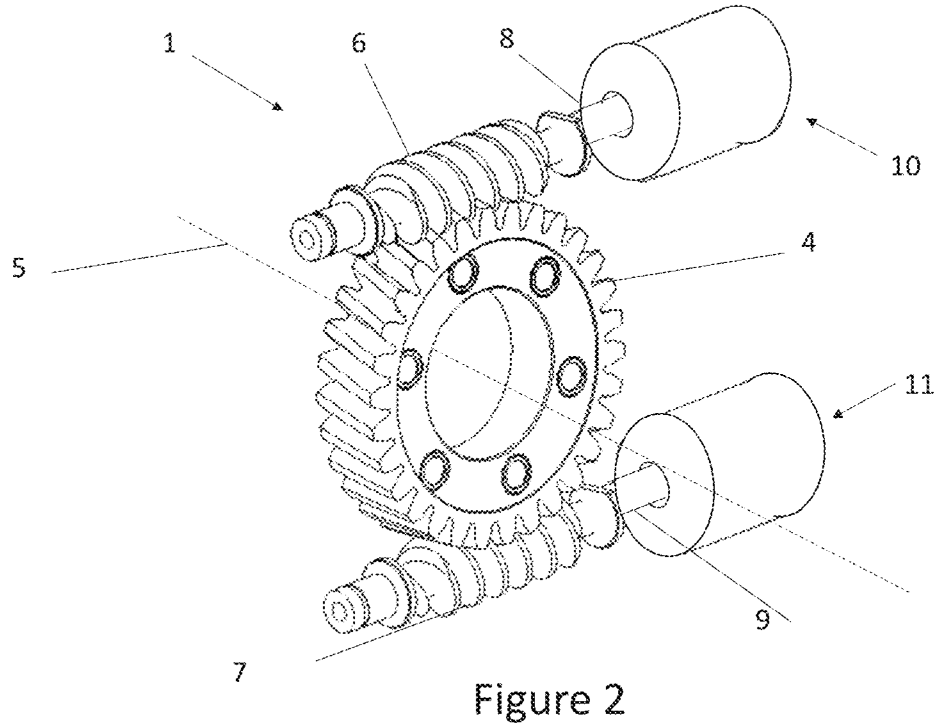
FIG. 2 shows a part of the dual motor drive apparatus of FIG. 1 with the gearbox housing removed to better show the gears and the motor connection to the gears.

FIG. 2 shows an axis of rotation of shaft 3 marked using a dashed line 5, extending perpendicularly through the wormwheel gear 4. The periphery of the wormwheel gear 4 is formed as a worm screw which meshes with each of two identical worm screws 6, 7 located on opposite sides of the longitudinal axis 5 of the shaft 3. Each worm screw 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the handwheel, the motors 10, 11 act in opposite directions on the wormwheel gear 4 to eliminate backlash. At higher levels of input torque applied to the shaft 3 by the handwheel, the motors 10, 11 act in the same direction on the wormwheel gear 4 to assist in rotation of the shaft 3. Here, a motor 10, 11 acting in 'a direction' is used to indicate the direction of torque applied by a motor 10, 11 to the wormwheel gear 4.

In the exemplary arrangement shown in FIGS. 1 and 2, the worm screws 6, 7 engage diametrically opposed portions of a wormwheel gear 4. The threads of the worm screws 6, 7 each have the same sense, i.e., they are both left-handed screw threads. The motors 10, 11 are configured such that they lie on the same side of the wormwheel gear 4 (both motors 10, 11 lie on one side of a virtual plane perpendicular to axes of the worm screws 6, 7 and passing through the centre point of the wormwheel gear 4). Considering as an example the perspective shown in FIG. 2, driving both motors 10, 11 clockwise would apply torque in opposite directions to the wormwheel gear 4, with motor 10 applying a clockwise torque to wormwheel gear 4 and motor 11 applying an opposing anti-clockwise torque to wormwheel gear 4.

Figure 3:
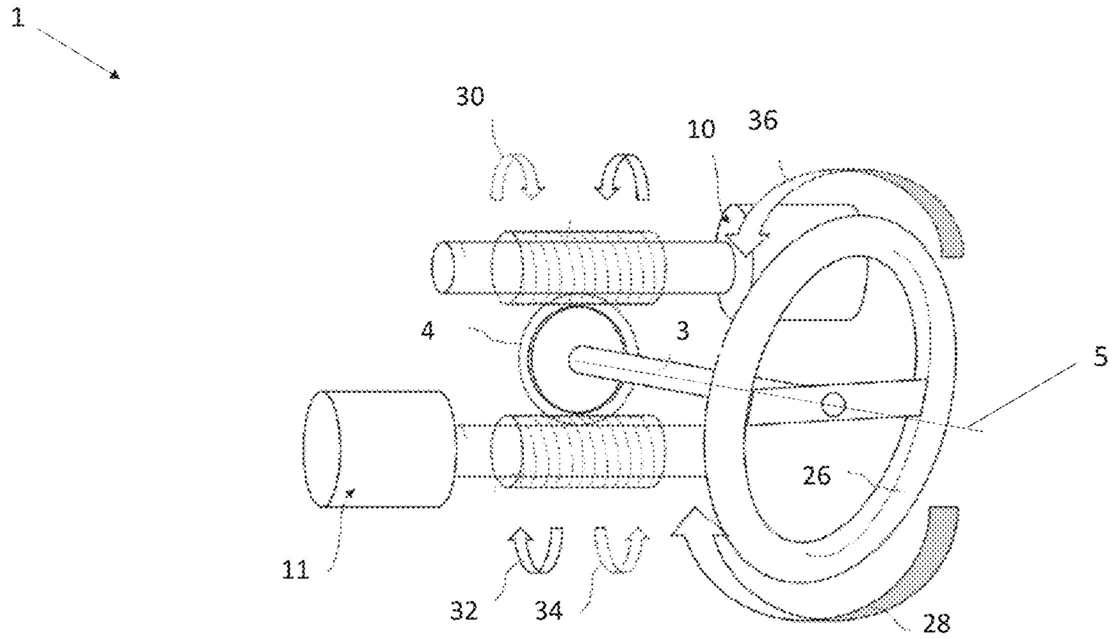
FIG. 3 shows another exemplary arrangement of a dual motor drive assembly according to a first aspect of the disclosure.

FIG. 3 shows another exemplary arrangement of a dual motor drive assembly, substantially similar to the arrangement shown in FIGS. 1 and 2 but with different motor positioning.

FIG. 3 shows an alternative configuration of a dual motor drive assembly 1 that may form part of a motor assembly of the disclosure. This exemplary arrangement is substantially similar to the arrangement shown in FIGS. 1 and 2 with the only difference being the positioning of the motors 10, 11. Components and functional units which in terms of function and/or construction are equivalent or identical to those of the preceding arrangement are provided with the same reference signs and are not separately described. The explanations pertaining to FIG. 1 and FIG. 2 therefore apply in analogous manner to FIG. 3 except for the positioning of the two motors 10, 11.

In FIG. 3 the worm screws 6, 7 engage diametrically opposed portions of a wormwheel gear 4 and threads of the worm screws 6, 7 each have the same sense, i.e., in this example, they are both right-handed screw threads in this example. The motors 10, 11 are configured such that they lie on opposing sides of the wormwheel gear 4 (motor 10 lies on one side of a virtual plane perpendicular to axes of the worm screws 6, 7 and passing through the centre point of the wormwheel gear 4 while motor 11 lies on the other side of this virtual plane).

Application of torque by a driver in a clockwise direction indicated by solid arrow 28 results in rotation of the handwheel 26 and the steering column shaft 3 about the dashed line 5. This rotation is detected by a rotation sensor (not shown). The first motor 10 is then controlled by the ECU 20 to apply torque in the opposite direction as indicated by dashed arrow 30.

The net result of the torques 30, 32, 34 applied by the first and second motors 10, 11 results in an application of a feedback torque to the steering column shaft 3 and handwheel 26, as indicated by a dashed arrow 36, to provide a sensation of road feel to the driver. In this example, the application of a feedback torque is in the opposite direction to that applied to the steering wheel 26 by the driver. In this way, the "rattle" produced between the worm screws 6, 7 and the wormwheel gear 4 can be eliminated or significantly reduced.

FIG. 4 shows part of an HWA assembly (80) showing a general arrangement of an electronic control unit (ECU) 20 which controls each of the two motors 10, 11. The ECU 20 may include a hand wheel actuator (HWA) control system 21 as well as a first and second motor controller 22, 23 which control the first and second motors 10, 11 respectively. The HWA control may be implemented by a separate ECU in other exemplary arrangements. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to theft respective motor controller 22, 23. The HWA control system 21 is configured to calculate the magnitude of mechanical friction using the motor torque demands. In another exemplary arrangement, the HWA control system 21 may be implemented by a separate ECU to the first and second motor controller 22, 23.

A processor 300 is provided that processes signals from both lanes. As shown, this comprises two processing circuits 310, 320. A first circuit forms a part of the first lane and a second processing circuit forms a part of the second lane. These may be independent with a communication link between the two (not shown) or may be provided by a single processing device. As will be explained later, the two processing circuits exchange or share information sufficient to allow estimates of the motor positions to be made that can be used to cross check the output signals from the motor position sensors 200, 210.

Figure 5:
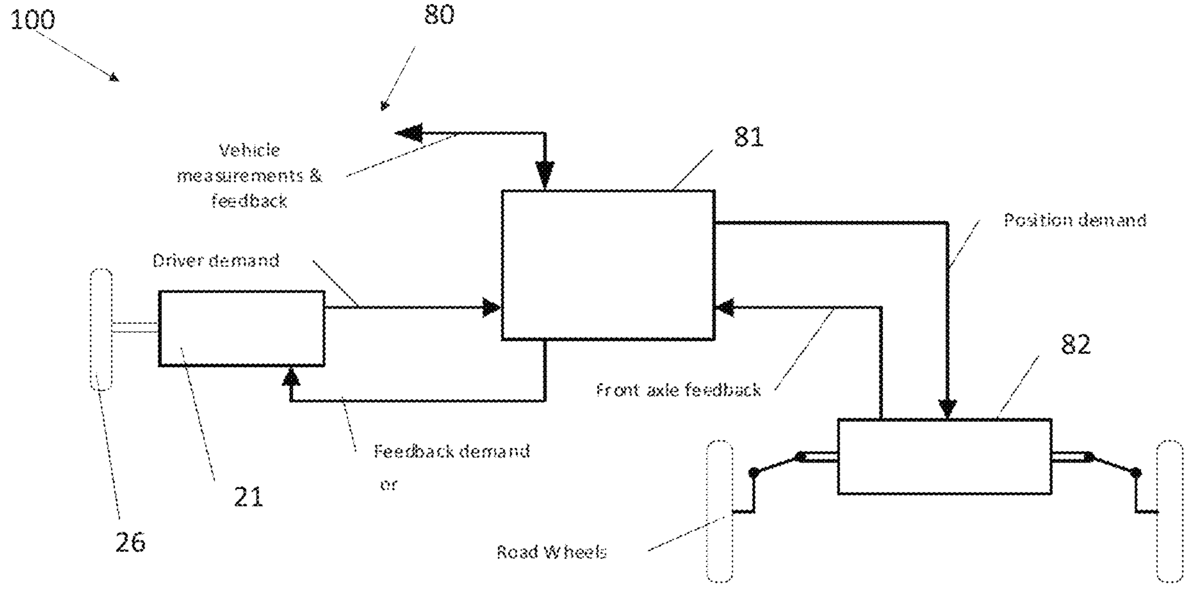
FIG. 5 shows a layout of a Steer-by-Wire system including a dual motor drive assembly according to a first aspect of the disclosure.

FIG. 5 shows an overall layout of a Steer-by-Wire system 100 for a vehicle including handwheel actuator (HWA) assembly 80 using a dual motor drive assembly 1 according to a first aspect of the disclosure. The HWA assembly 80 supports the driver's handwheel 26 and measures the driver demand which is usually the steering angle. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. Alternately, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. Alternatively, control functions ascribed to the HWA controller 21 and FAA 82 may be partially or totally implemented in the steering controller 81.

Figure 6:
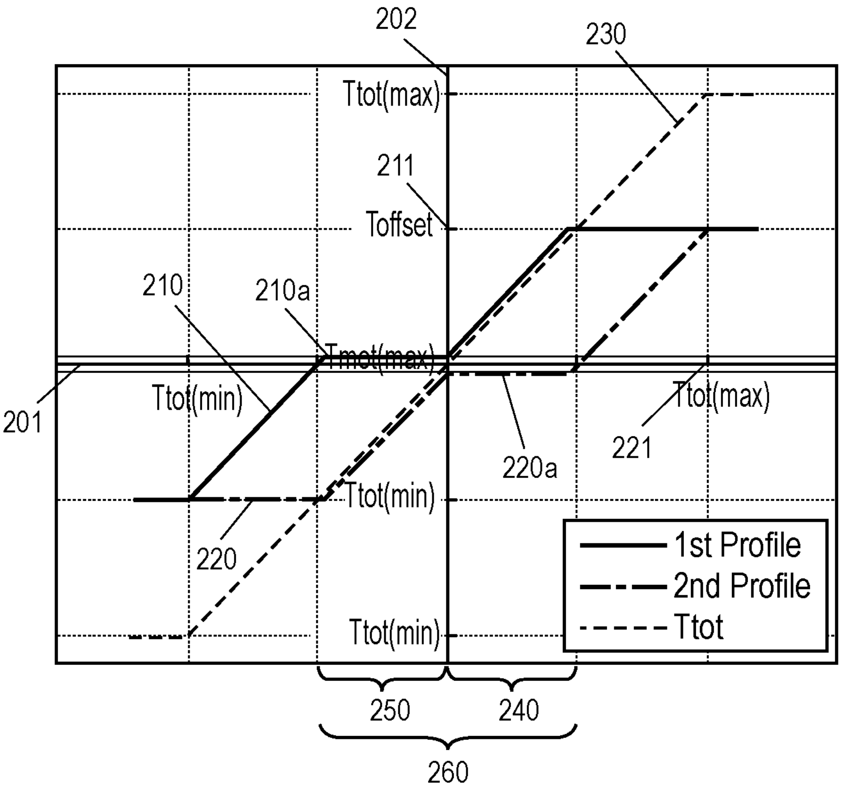
FIG. 6 shows a relationship between the feedback torque demanded and the feedback torque applied for a dual motor drive assembly according to a first aspect of the disclosure.

The relationship between the total torque demanded to provide feedback to the driver (x-axis) 201 and the feedback torque applied (y-axis) 202 for a dual motor drive assembly according to a first aspect of the disclosure is shown in FIG. 6.

The dual motor drive assembly 1 further comprises a torque demand allocation arrangement for allocating torque demands to each of the first and second motors 10, 11. A first profile 210, shown as a solid line in FIG. 6, defines a relationship between a total torque demanded for the shaft and the torque demand allocated to one of the first and second motors 10, 11. When the dual drive assembly 1 is allocating torque according to a first mode, the first profile 210 represents the torque applied by the first motor 10. A second profile 220, shown as a dot-dash line in FIG. 6, defines a different relationship between a total torque demanded for the shaft and the torque demand allocated to one of the first and second motors 10, 11. When the dual drive assembly 1 is allocating torque according to a second mode, the second profile 220 represents the torque applied by the second motor 11. The net torque applied by the two motors is represented by dashed line 230.

In a first torque range 240 where torque is positive, the first motor 10 applies a torque shown by profile 210 to provide feedback to the steering column shaft 3 and handwheel 26, while the second motor 11 applies a smaller magnitude torque known as an "offset torque" in the opposite direction (shown by profile 210) to provide an "active" lock to eliminate or reduce transmission rattle. The roles of the motors change depending in which direction the driver is steering. In a second torque range 250 where the torque is negative, the second motor 110 applies a feedback torque 220 to the steering column shaft 3 and the first motor 10 applies a smaller magnitude "offset" torque in the opposite direction.

The offset torque 210*a* applied by the first motor 10 is indicated by the constant torque region located within the second torque range 250.

The offset torque 220*a* applied by the second motor 11 is indicated by the constant torque region located within the first torque range 240.

Together, the first torque range 240 and second torque range 250 extend across a low torque region 260.

It can be seen in FIG. 6 that as the total torque demanded increases from zero the first motor 10 provides an increasing applied torque 210 until a maximum output 211 for the first motor 10 is reached. As the total torque demanded further increases, the applied torque 220 provided by the second motor 11 increases such that both motors 10, 11 are applying a torque in the same direction (e.g., positive in the top right quadrant) to the first wormwheel gear 4. The net torque 230 applied by the two motors 10, 11 can be seen to increase at a constant rate from zero until a maximum output 221 for the second motor 11 is reached, at which point both the first and second motors have reached their maximum output torques 211, 221 and the net torque 230 plateaus.

In the low torque region 260 the torque demand allocation arrangement for allocating torque demands to each of the first and second motors 10, 11 is allocating torque to the first and second motors 10, 11 such that each output worm screw 6, 7 applies an opposing torque to the wormwheel gear 4, in order to control mechanical backlash.

FIG. 6 shows example torque values where one motor reaches its maximum torque output before the other motor cross over such that both motors are working together. In other examples, any torque profiles may be used. For example, the second motor may cross over to work with the first motor before the first motor reaches a maximum output torque, and vice versa. In this way, both motors spend less time at maximum output torque as higher total torques can be provided before a motor reaches maximum output torque. This in turn reduces losses and increases working life.

After a motor has crossed over to work with the other motor, as the total demanded torque increases the allocated torque demands may become equal. Both motor torques may become equal prior to either motor reaching a maximum output torque. The point at which the motors go from outputting different torque value to outputting an equal torque may be described as a blending point. For any demanded total torque above the blending point where the allocated torque demands become equal, the allocated torque demands to both motors may increase at an equal rate. In this way, there may be a torque range up to an including the maximum total torque where the torque demands to both motors are equal. In some examples, at the blending point the allocated torque demands may switch from the first profile 210 to the second profile 220, or vice versa. As the output torque from the first and second motor 10, 11 is equal, the switch is smooth.

Figure 16:
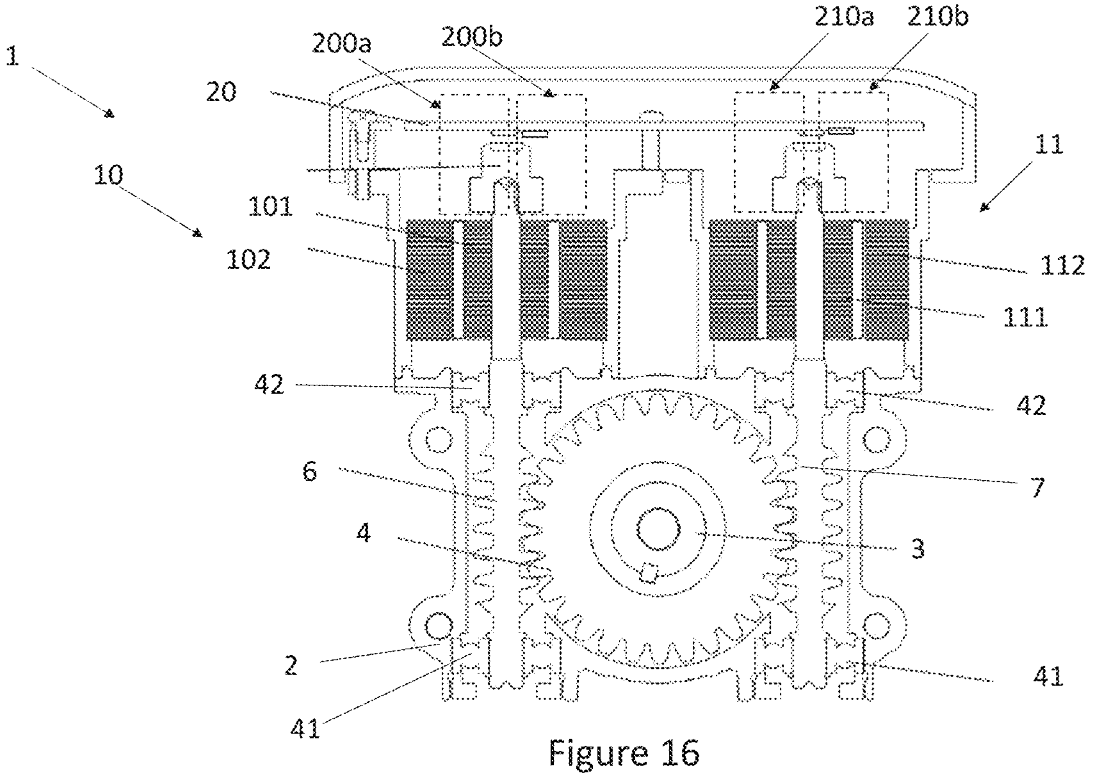
FIG. 16 shows an assembly with dual motor positions sensors for each lane.

The dual drive motor assembly further comprises an observation arrangement for observing a differential motion of the two motors 10, 11 under a positive and a negative polarity of differential torque. This is achieved by in each lane a respective motor position sensor (MPS). FIG. 1 shows two sensors MPS1 200 and MPS2 210, with each comprising a magnetic sensor target 201, 211 that is fixed to the motor rotor and a Hall Effect sensor 202, 212 fixed relative to the housing. Such sensors are well known and will not be described in detail here. The sensors each produce an output indicate of the angular position of the respective motor over at least one full revolution of the motor. FIG. 16 shows an alternative in which each motor is provided with two motor position sensors 201*a*, 201*b* and 210*a* and 210*b*. Each sensor has a dedicated Hall Effect sensor but a common target is used for the two sensors of each lane. In a modification two targets could be used.

Figure 7:
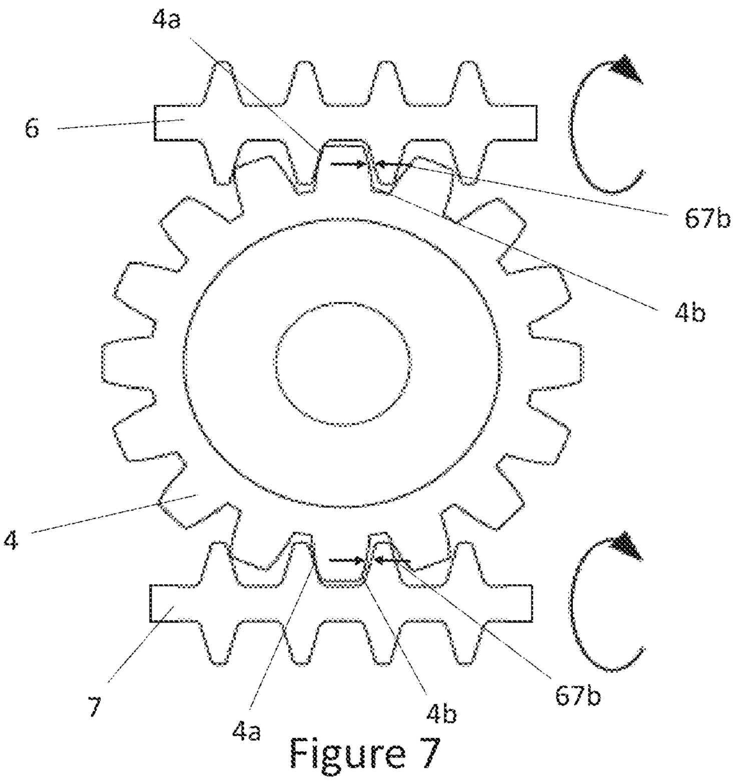
FIG. 7 shows an exemplary arrangement of a dual motor drive assembly according to a first aspect of the disclosure when a total demanded torque is in a low torque region and a positive differential torque is applied.

FIG. 7 shows the interaction between the first worm 6, second worm 7 and the wormwheel gear 4 when the total demanded torque is in the low torque region 260 and a positive differential torque is applied (between the first motor 10 and the second motor 11).

The torque allocations to the motors 10, 11 are configured such that the worm screws 6, 7 rotate clockwise and apply opposing torques to the wormwheel gear 4. In this way, flanks 4*a* on the left-hand side of the wormwheel gear 4 as shown in FIG. 7 are in contact with the worm screws 6, 7 whilst flanks 4*b* on the opposing side of the same teeth are not. Typically, there is clearance in the assembly in the form of gaps between the wormwheel gear 4 and the teeth of the first and second worm 6, 7. When there is a positive differential torque applied, a first backlash 67*a* will be present caused by gaps between flanks 4*b* of the wormwheel gear 4 and corresponding flanks of teeth of the first and second worm screws 6,7.

Figure 8:
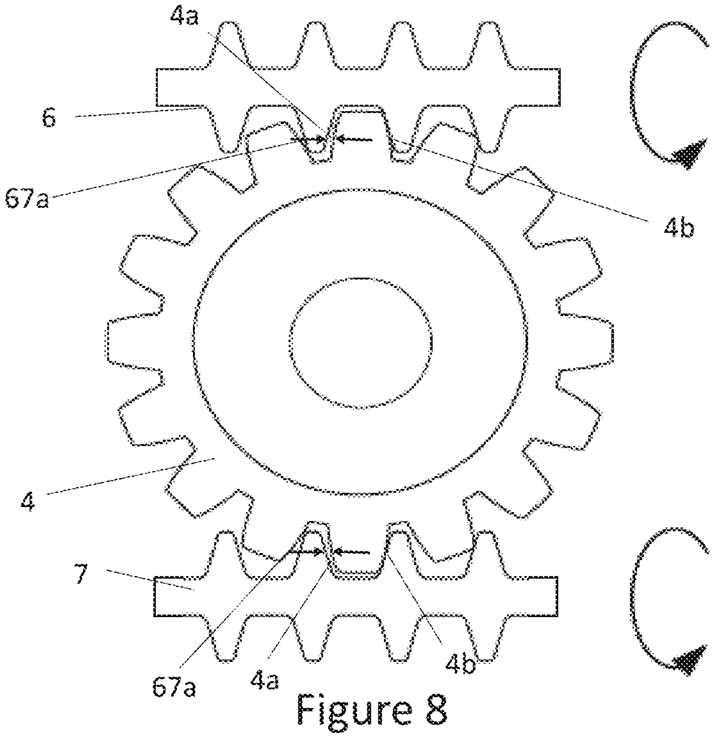
FIG. 8 shows the dual motor drive assembly of FIG. 7 when a total demanded torque is in a low torque region and a negative differential torque is applied.

FIG. 8 shows the interaction between the first worm 6, second worm and the wormwheel gear 4 when the total demanded torque is in the low torque region 260 and a negative differential torque is applied (between the first motor 10 and the second motor 11).

Each of the torques allocated to the first and second motors 10, 11 is in an opposing direction to FIG. 7 where a positive differential torque is applied. As shown in FIG. 8, the flanks 4*b* on the right-hand side of the wormwheel gear 4 are in contact with the worm screws 6, 7 whilst the flanks 4*a* on the opposing side of the same teeth are not. When there is a negative differential torque applied, a second backlash 67*b* will be present caused by gaps between flanks 4*a* of the wormwheel gear 4 and corresponding flanks of teeth of the first and second worm screws 6, 7.

Within the low torque region 260 the torque allocated to the first motor 10, where a positive differential torque is applied, is in an opposing direction to the torque allocated to the first motor 10 where a negative differential torque is applied. Similarly, the torque allocated to the second motor 11, where a positive differential torque is applied, is in an opposing direction to the torque allocated to the second motor 11 where a negative differential torque is applied. By providing a processor operable to switch the torque allocations between positive torque differential and a negative torque differential at two moments in time an estimate of the total backlash in the gearbox may be calculated. The total backlash is an indication of the wear of a gearbox. In response to this calculation, worn out components may then be replaced during servicing. This can be performed during a special calibration process, for instance at power up or power down or at any time during operation of the motor where suitable torques are being applied by the motors. Operation within the low torque mode provides plenty of opportunity to take measurements that can be used to determine backlash if required. The present disclosure can be implemented using fixed, predetermined, values for backlash that may be stored in a memory when it is not expected that backlash will change during the operational lifetime of the assembly or between servicing checks where it can be reset.

Figure 9:
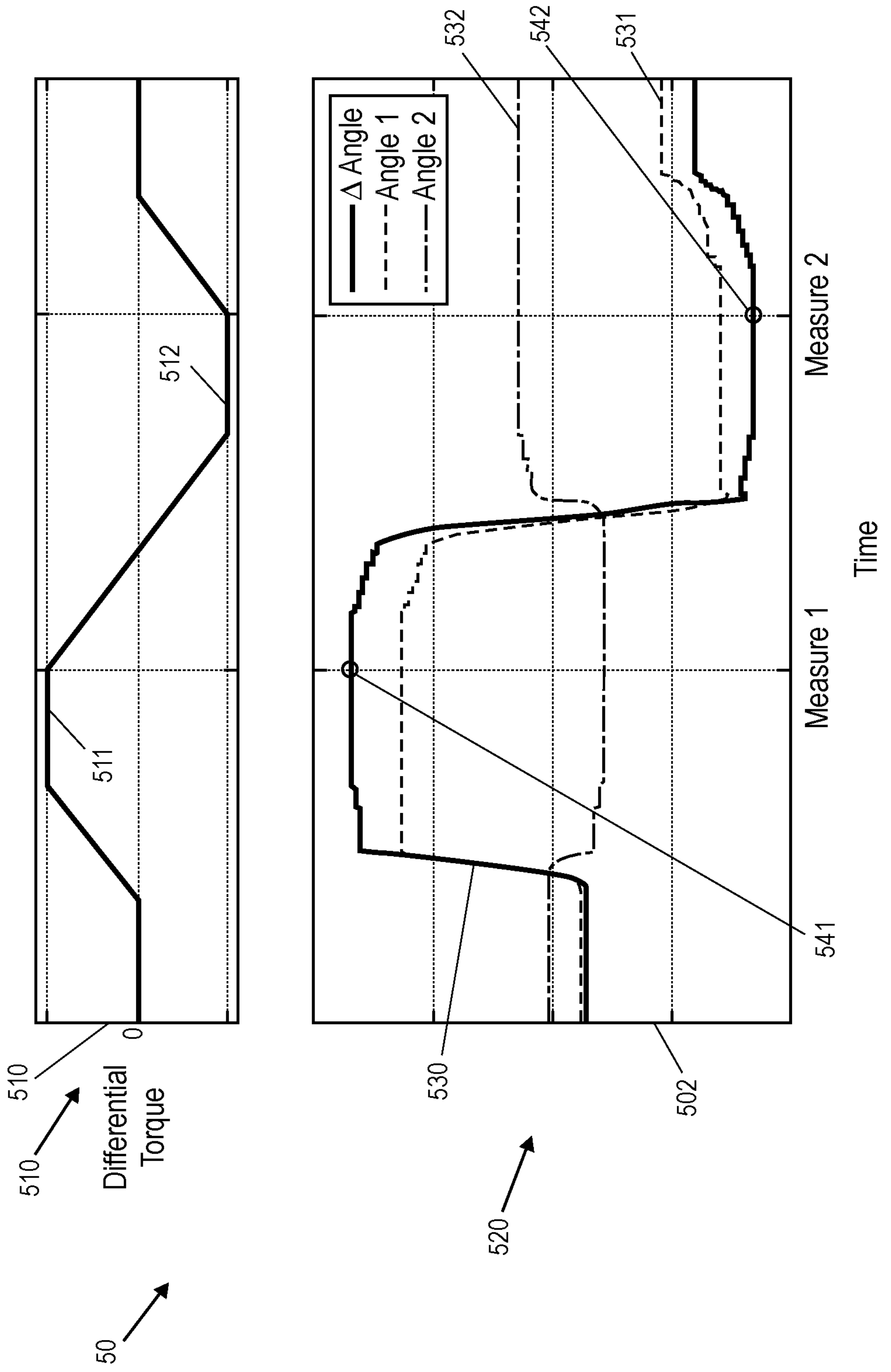
FIG. 9 shows the angular positions of the two motors on moving across the backlash and then returning across the backlash by changing the polarity of the torque applied by both motors of the assembly.
Figure 10:
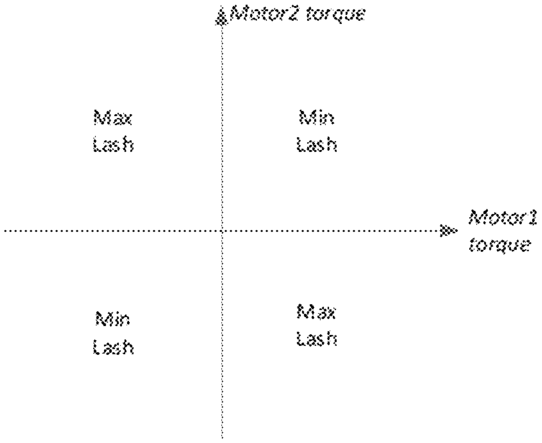
FIG. 10 shows how the total backlash is greatest when the motors apply opposite polarity torques and is lowest when they apply the same torque polarity.

FIG. 9 shows the effect of the backlash on the motor position measured by each of the two sensors 200,210 when moving from one pair of motor torque polarities to the opposite and then back again. This corresponds to movement between the two Max Lash quadrants shown in FIG. 10.

Total backlash in the gearbox may be estimated when the dual drive motor assembly 1 is not providing feedback to the driver, for example during power up or power down of the assembly 1 or while the vehicle is operating semi-autonomously. In this way, a closed-loop control system may be used to hold the handwheel at a substantially constant angle by varying the differential torque.

The correct functioning of the two lanes of the assembly requires the motor position sensors to be operating correctly. If one sensor fails the motor cannot be correctly controlled. There follow several arrangements within the scope of the present disclosure for checking the correct operation of the motor position sensors.

A common feature to each of the first four arrangements is the exchange of information from one lane to the other allowing for estimates of the position of one motor to be made using measurements of the position of the other motor. The applicant has appreciated that this is possible provided that any backlash in the system is taken into account when present. It is also required to take account of any fixed offset between the motors.

Exemplary Arrangement A—Baseline—Exchange Column Angles

Figure 11:
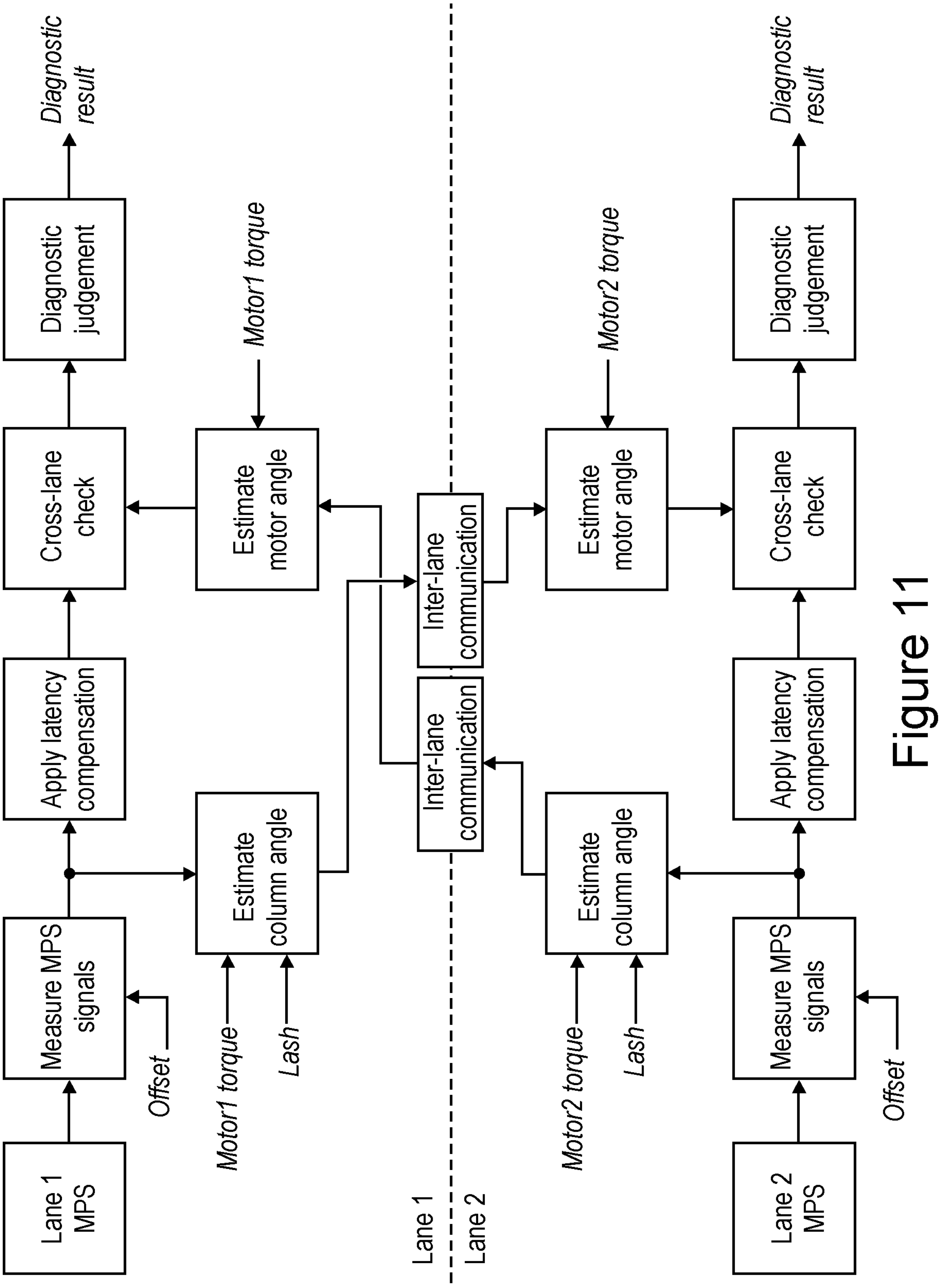
FIG. 11 is a block diagram of a first exemplary arrangement A of a scheme for cross checking the motor position sensor outputs that may be implemented in a processor of the assembly of FIG. 3.

FIG. 11 is a block diagram showing a scheme that is implemented with the processor of the assembly of FIG. 4 for inter-lane cross-check of the motor position sensors (MPS). Each lane measures the MPS signals to determine an MPS angle. The MPS measurement is accumulated and offset to align it with the column (see notes on accumulation above). Each lane then estimates the column angle according to the motor torque of that lane.

The estimate depends on the backlash and gearbox compliance between the motor shaft and the column shaft:

$$\hat{\theta}_{col2} = \frac{MPS_2}{N_{gb}} - \text{Lash}_2\text{sgn}(T^*_{mot2}) - \frac{N_{gb}T^*_{mot2}}{K_{gb}}$$

where $\hat{\theta}_{col2}$ is the estimated column angle based on lane 2 measurements, MPS2 is the offset of the signal output form the second motor position sensor 210, $\text{Lash}_2$ is the lash in wormshaft of the second motor measured at the wormwheel, $T^*_{mot2}$ is the demanded torque for the motor of lane 2, $N_{gb}$ is the gearbox ratio and $K_{gb}$ is the stiffness of the gearbox. A similar calculation can be applied in lane 1.

The estimated column angles are then exchanged between the two lanes. The estimated column angle is then converted back into a motor angle for the receiving lane using the backlash for the receiving lane. Thus, each lane generates a signal that is compensated for the backlash between both worms.

In lane 1, the measurement from lane is treated thus:

$$\widetilde{MPS}_1 = N_{gb}\left(\hat{\theta}_{col2} + \text{Lash}_1\text{sgn}(T^*_{mot1}) - \frac{N_{gb}T^*_{mot1}}{K_{gb}}\right)$$

where $\widetilde{MPS}_1$ is the estimated MPS angle and $T^*_{mot1}$ is the motor 1 torque demand.

A latency compensation is applied to the MPS signal within the lane. This delays the signal to compensate for the delay in the inter-lane communication.

Each lane can then cross-check its own MPS signal with the signal from the other lane. The cross-check will take account that the signals could be different by a number of whole revolutions but will determine if there is a significant error that is not expected.

Finally, a diagnostic judgement block will analyse the cross-check result over a period time to decide if the error is persistent, or if particular conditions may delay the result (e.g. transient behaviour).

Each motor angle is converted to column angle with backlash/compliance compensation. Then the column estimate is converted back to motor angle in the opposite lane.

Exemplary Arrangement B—Directly Cross-Check MPS with Backlash

Figure 12:
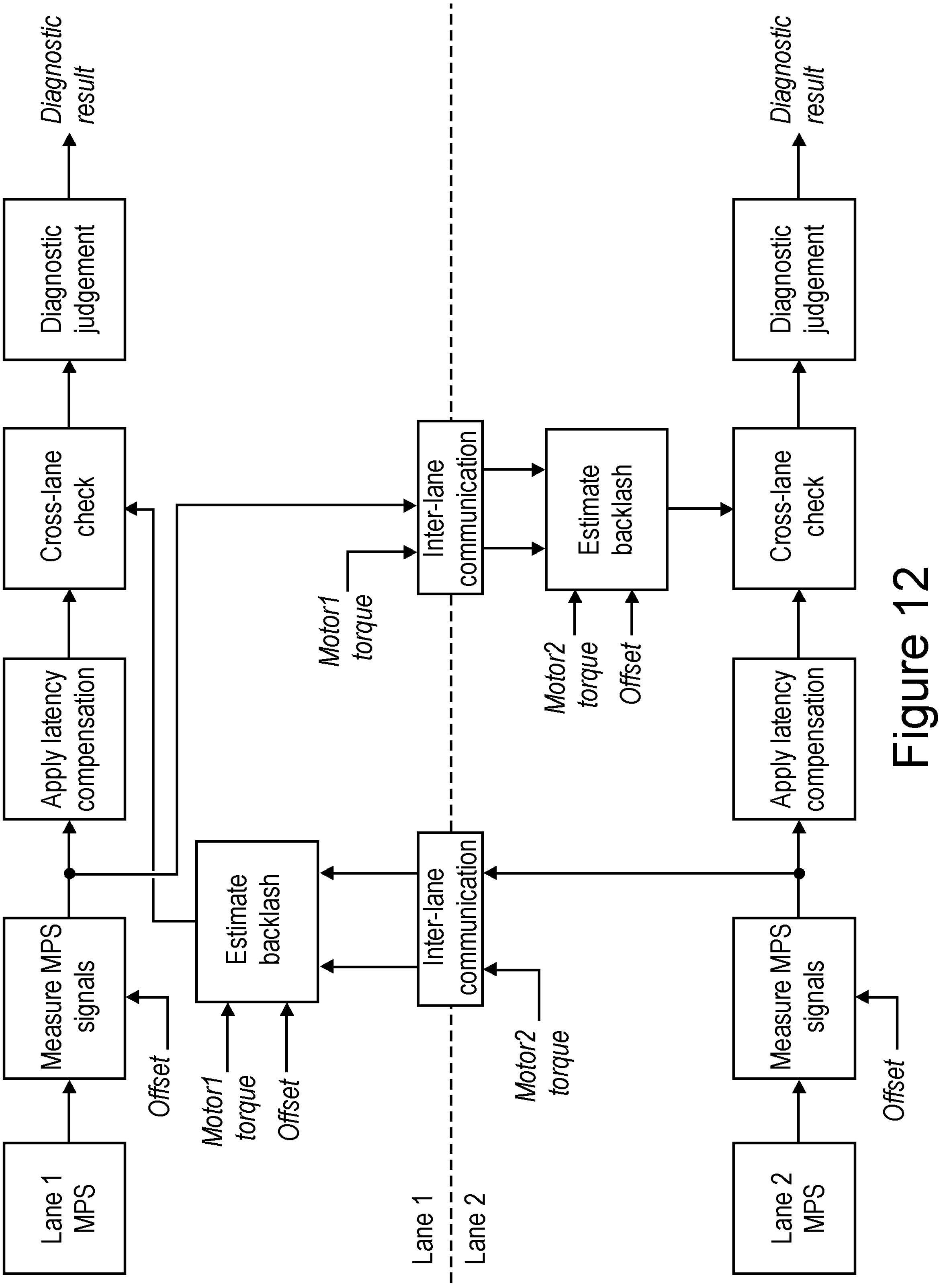
FIG. 12 is a block diagram of a second exemplary arrangement B of a scheme for cross checking the motor position sensor outputs that may be implemented in the processor of the assembly of FIG. 3.

FIG. 12 is a block diagram similar to that of FIG. 11 that shows an alternative scheme that is implemented by the processor of the assembly and that employs a single backlash compensation. The blocks are similar to the previous figure except for the backlash estimation.

The estimated lane 1 MPS position using the MPS2 measurement is:

$$\widetilde{MPS}_1 = \begin{cases} MPS_2 - \left(2\text{Lash}_{gb}\text{sgn}(T^*_{mot2}) + \frac{(T^*_{mot2} - T^*_{mot1})}{K_{gb}}\right) & \text{when } \text{sgn}(T^*_{mot1}) \neq \text{sgn}(T^*_{mot2}) \\ MPS_2 & \text{otherwise} \end{cases}$$

where $Lash_{gb}$ is the total lash across the wormwheel in at the wormshaft, and $K_{gb}$ is the compliance in the gearwheel seen from the wormshaft.

This alternative scheme eliminates the need to convert to the shaft axis and back by combining the backlash compensation.

Figure 13:
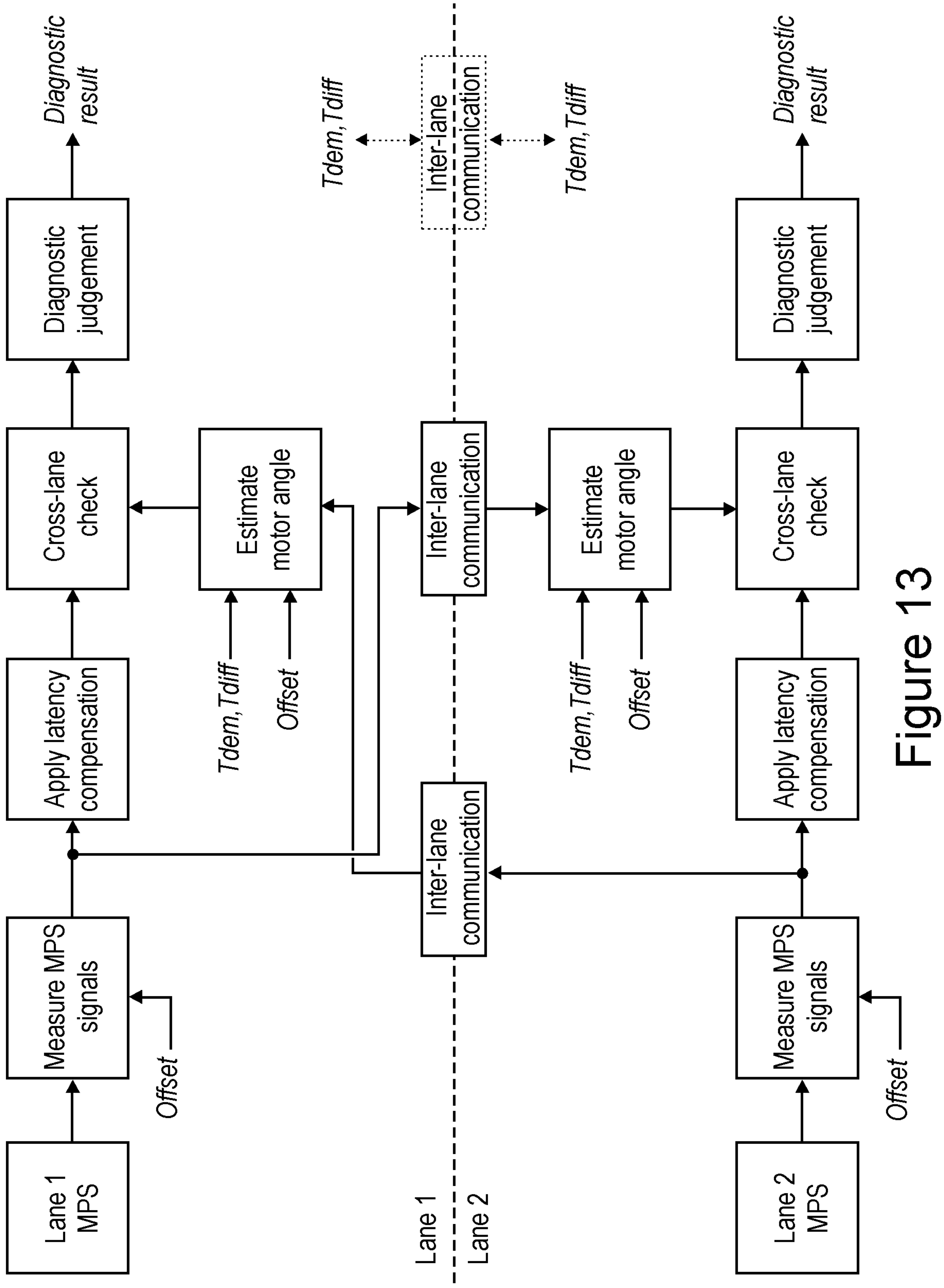
FIG. 13 is a block diagram of a third exemplary arrangement C of a scheme for cross checking the motor position sensor outputs that may be implemented in the processor of the assembly of FIG. 3.

Exemplary Arrangement C—Directly Cross-Checking MPS Using Torque Demand & Difference FIG. 13 is a block diagram of a third scheme that may be implemented by the processor of the assembly. This arrangement that is similar to the previous one, except that the demanded torque $T_{dem}$ and difference $T_{diff}$ are used. It is a mathematical rearrangement but may be more convenient to implement since the demand torque and torque difference have to be synchronised between the two lanes in any case.

The estimated lane 1 MPS position using the MPS2 measurement is:

$$\widehat{MPS}_1 = \begin{cases} MPS_2 + \left(2\text{Lash}_{gb}\text{sgn}(T_{diff}) + \dfrac{T_{diff}}{K_{gb}}\right) & \text{when } |T_{dem}| < |T_{diff}| \\ MPS_2 & \text{otherwise} \end{cases}$$

where $T_{dem}$ is the total demand in terms of motor shaft torque and $T_{diff}$ is the difference between the motor shaft torque demand (these are used in the different torque allocation strategies).

This scheme is similar to the exemplary arrangement B, but uses $T_{dem}$ and $T_{diff}$ instead of the actual applied torques from the two motors.

Exemplary Arrangement D—Extend to Two MPS per Lane Case

Figure 14:
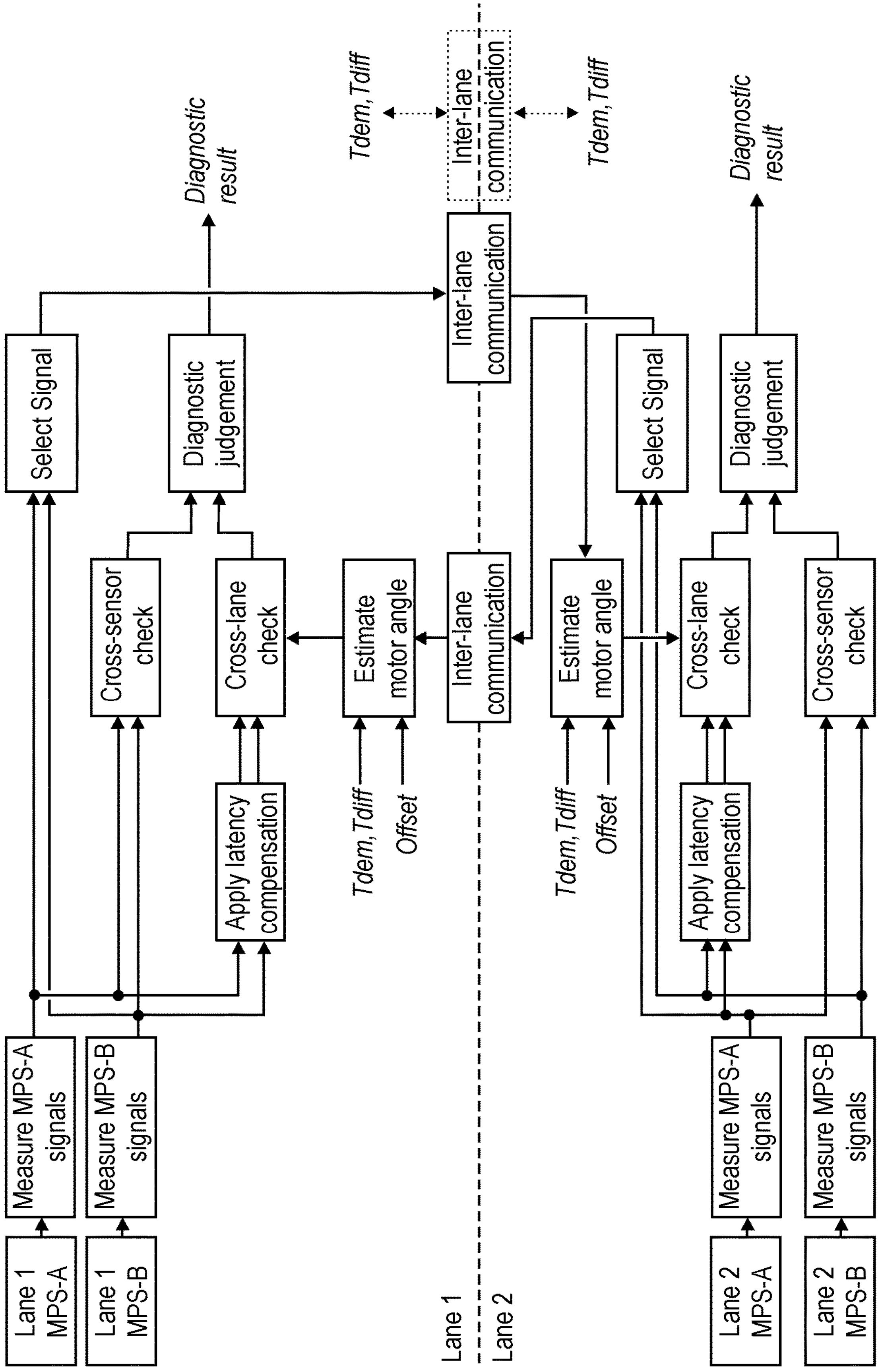
FIG. 14 is a block diagram of a fourth exemplary arrangement D of a scheme for cross checking the motor position sensor outputs that may be implemented in the processor of the assembly of FIG. 3 that uses two motor position sensors per lane.

FIG. 14 shows a scheme that has two motor position sensors per lane. This extends any of the first three schemes by providing that each lane has its own redundant motor position measurement. In the event that a lane has two different but plausible motor position signals, the lane-to-lane cross-check can be used to arbitrate between the signals to allow one to be selected for a degraded operating mode.

This is the same as the previous exemplary arrangement but with extra checking between the sensor in each lane. A "Select signal" block is added to choose the signal that is sent for the opposite lane cross-check.

Exemplary Arrangement E—Active Check Using Travel Across Backlash

Figure 15:
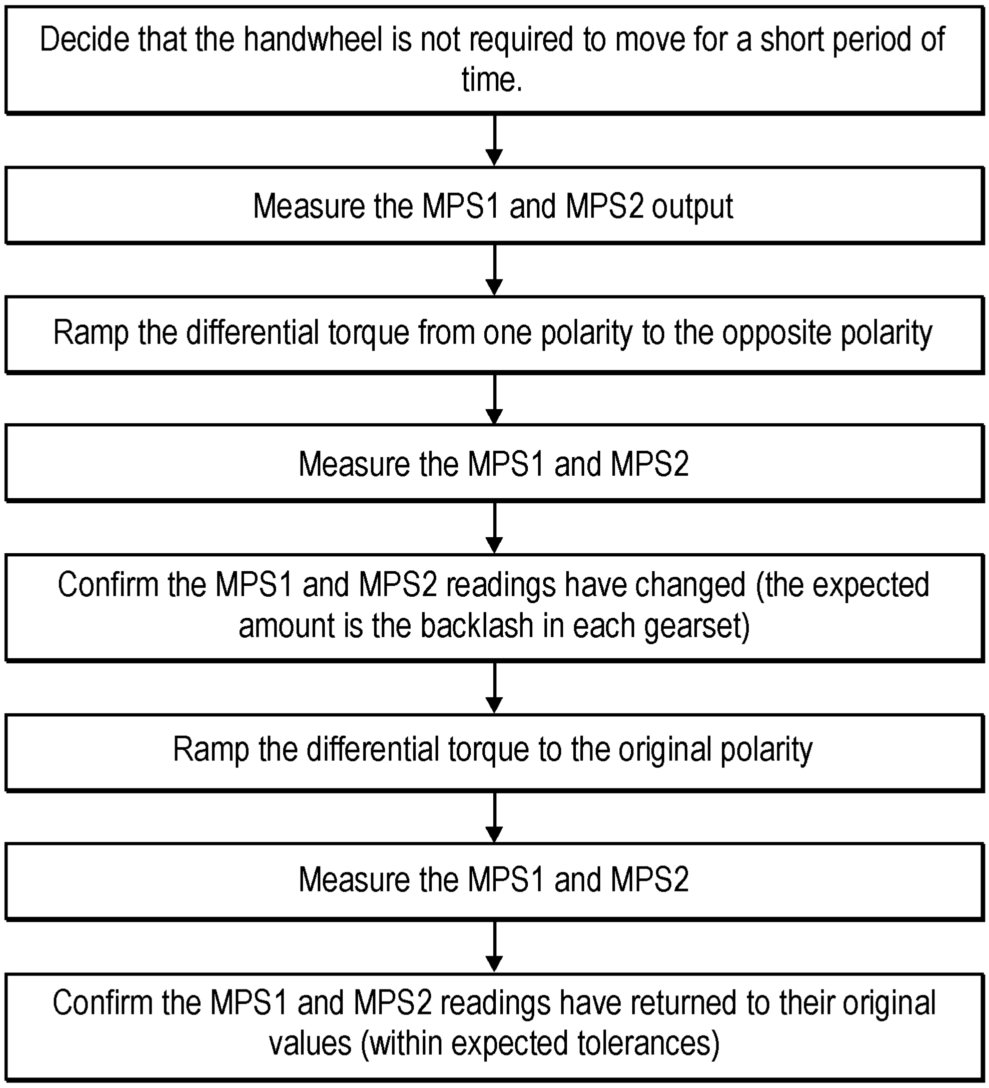
FIG. 15 is a flowchart of the steps of a fifth exemplary arrangement of a scheme for checking for a fault in one of the motor position sensors by actively moving the motors across their backlash without moving the shaft.

Another arrangement is shown in the flowchart of FIG. 15. This sets out an exemplary process that can be performed at a time when the shaft is stationary that allows for some checking of the motor sensors to be performed in such a way that it cannot be perceived by a driver holding a handwheel attached to the shaft.

The applicant has appreciated that the connection between each motor and the shaft will have some backlash. During normal operation the two motors apply torques of opposite polarity to remove any free play due to backlash as explained in the applicants' earlier patent application GB 2579374 A. On reversing the polarity of both motors they will each move "across" their respective backlash until that free play is taken up and the motor apply their reversed polarity torques to the shaft. During this transition the motors will move but the shaft will not move. The amount of movement in each motor will depend on the backlash in each of the gear meshes. This can provide a check on each MPS by confirming the MPS has not failed with a "frozen" output.

The check can be carried out either at power-up, or when there is no activity on the handwheel. For example, it may be desirable to check that the MPS is working during a period of autonomous driving.

As shown in FIG. 15 the check comprises the following steps performed in the listed order although variations are possible within the scope of the disclosure:

a) Decide that the handwheel is not required to move for a short period of time.
b) Measure the MPS1 and MPS2 output
c) Ramp the differential torque from one polarity to the opposite polarity
d) Measure the MPS1 and MPS2
e) Confirm the MPS1 and MPS2 readings have changed (the expected amount is the backlash in each gearset)
f) Ramp the differential torque to the original polarity
g) Measure the MPS1 and MPS2; and
h) Confirm the MPS1 and MPS2 readings have returned to their original values (within expected tolerances).

It will be understood that the disclosure is not limited to the exemplary arrangements described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein.

The invention claimed is:

1. A dual motor drive assembly, for use in a handwheel actuator assembly of a vehicle, comprising:
- a housing;
- a shaft rotatably mounted to the housing;
- a first gear connected to and configured to rotate with the shaft;
- a first motor lane comprising a first motor having an output, a motor drive stage which drives the first motor in response to a torque demand to cause the first motor output to apply a torque to the first gear, and a first motor position sensor that generates a first motor position signal indicative of an angular position of the first motor,
- a second motor lane comprising a second motor having an output, a motor drive stage which drives the second motor in response to a torque demand to cause the second motor to apply a respective torque to the first gear, and a second motor position sensor that generates a second motor position signal indicative of an angular position of the second motor,
- the two outputs of the first and second motors being engaged with the first gear such that the torque output by both motors is applied to the shaft; and
- in which the assembly further comprises a processor that generates an estimate of the angular position of the first motor using at least the signal output from the second motor position sensor and taking account of an effect of any backlash in the assembly, and cross-checking the first motor position signal against the estimate of the motor angular position to determine if at least one of the motor position sensors is faulty.

2. A dual motor drive assembly according to claim 1 in which the processor generates an estimate of a shaft position that takes account of backlash in gears connecting the second motor to the shaft, and the estimate of the first motor angular position derived from this shaft position estimate takes account of the backlash in the gears connecting the first motor to the shaft.

3. A dual motor drive assembly according to claim 2 in which the estimate of the shaft position further takes account compliance in the motor and gears of the first and second lanes.

4. A dual motor drive assembly according to claim 1 in which the processor comprises a first processing circuit that forms part of the first lane and a second processing circuit that forms part of the second lane.

5. A dual motor drive assembly according to claim 1 in which the second processing circuit transmits to the first processing circuit an estimate of the position of the shaft determined from the second motor position signal, the first processing circuit in turn determining an estimate of the first motor position from the estimate of the shaft position.

6. A dual motor drive assembly according to claim 1 in which the second processing circuit transmits to the first processing circuit the output of the second motor position sensor and a signal indicative of the torque applied to the shaft by the second motor and in which the first processing circuit estimates the first motor position by combining the transmitted information with a signal indicative of the torque applied to the shaft by the first motor.

7. A dual motor drive assembly according to claim 1 in which the processor takes account of any known angular position offset between the two motors when determining the estimate of the first motor position for use in the cross check.

8. A dual motor drive assembly according to claim 1 in which the second processing circuit transmits only the output of the second motor position sensor to the first processing circuit and the estimate of first motor position is performed by combining the output of the second motor position sensor with the demanded torque and difference between the two demand torques.

9. A dual motor drive assembly according to claim 1 in which the transmission of signals between lanes is bi-directional and the processor generates an estimate of the position of the second motor using at least the motor position output from the first motor position sensor and cross-checks the second motor position signal against the estimate of the second motor position to determine if at least one of the motor position sensors is faulty.

10. A dual motor drive assembly according to claim 1 in which the processor is adapted to take account of any latency between the estimates of motor position and the measured motor angular positions due to time needed to transmit information across lanes and to generate the estimates of motor angular position.

11. A dual motor drive assembly according to claim 1 in which each lane comprises two motor position sensors each independently producing a motor position signal indicative of the angular position of the motor of a respective lane, and in which the processor of each lane is configured to cross-check its own two motor position sensors.

12. A dual motor drive assembly according to claim 1 which further comprises a motor controller which is arranged to allocate torque demands to the motor drive circuit of each of the first and second lanes to cause each motor to apply a respective torque to the first gear to cause the two motors to move across their respective gearbox backlash in synchronisation with performing of the cross check of the output signals from the motor position sensors.

13. A dual motor drive assembly according to claim 12 in which the cross check further comprises comparing the change in the motor position signals during the movement across the backlash to an expected change, and to flag an error if there is a mismatch.

14. A dual motor drive assembly, for use in a handwheel actuator assembly of a vehicle, comprising:
- a housing;
- a shaft rotatably mounted with respect to the housing;
- a first gear connected to and configured to rotate with the shaft;
- first and second motors, each having an output driving a respective output gear, the output gears being engaged with the first gear;
- a motor controller which allocates torque demands to each of the first and second motors to cause each motor to apply a respective torque to the first gear,
- a shaft position determining arrangement comprising a first motor position sensor arranged to determine a respective angular position signal indicative of an angular position of the first motor, a second motor position sensor arranged to determine an angular position of the second motor, and a processor which is arranged to generate a first estimate of the shaft position based on the angular position signal of the first motor position sensor and a second estimate of the shaft position based on the angular position of the second motor position sensor,
- the processor of the assembly further being arranged to cause the two motors to move across their respective gearbox backlash in synchronisation with a cross check of the output signals from the motor position sensors, and in which the cross check takes account of any backlash in the connection of the motors to the shaft.

15. A dual motor drive assembly according to claim 14 in which the motor controller actively allocates the torque to each motor to provide a differential bias torque that moves the respective motor across the gearbox backlash when operating with a low output torque when the operating conditions permit.

16. A dual motor drive assembly according to claim 15 in which the motor controller at a first time causes the motors to apply opposing torques that generate a positive differential torque and at a second time apply opposing torques that generates a negative differential torque.

17. A dual motor drive assembly according to claim 14 in which the dual motor drive assembly comprises a handwheel actuator assembly for a vehicle and the processor is arranged to estimate the level of backlash by observing a differential motion of the two motors during a period of operation with near-zero motion of the shaft.

18. A method of operating a dual motor drive assembly, for use in a handwheel actuator assembly of a vehicle which comprises:
- a housing;
- a shaft rotatably mounted with respect to the housing;
- a first gear connected to and configured to rotate with the shaft;
- a first motor lane comprising a first motor having an output, a motor drive stage which drives the first motor in response to a torque demand to cause the first motor output to apply a torque to the first gear, and a first motor position sensor that generates a first motor position signal indicative of an angular position of the first motor,
- a second motor lane comprising a second motor having an output, a motor drive stage which drives the second motor in response to a torque demand to cause the second motor to apply a respective torque to the first gear, and a second motor position sensor that generates a second motor position signal indicative of an angular position of the second motor, the two outputs of the motors being engaged with the first gear such that the torque output by both motors is applied to the shaft; and the two output gears being engaged with the first gear such that the torque output by both motors is applied to the shaft; and a processor; the method comprising:

generating an estimate of the position of the first motor using at least the signal output from the second motor position sensor and taking account of the effect of any backlash in the assembly; and cross-checking the first motor position signal against the estimate of the motor position to determine if at least one of the motor position sensors is faulty.

19. A method of operating a dual motor drive assembly, for use in a handwheel actuator assembly of a vehicle which comprises:

a housing;

a shaft rotatably mounted with respect to the housing;

a first gear connected to and configured to rotate with the shaft;

a first motor lane comprising a first motor having an output, a motor drive stage which drives the first motor in response to a torque demand to cause the first motor output to apply a torque to the first gear, and a first motor position sensor that generates a first motor position signal indicative of an angular position of the first motor, a second motor lane comprising a second motor having an output, a motor drive stage which drives the second motor in response to a torque demand to cause the second motor to apply a respective torque to the first gear, and a second motor position sensor that generates a second motor position signal indicative of an angular position of the second motor, the two outputs of the respective motors being engaged with the first gear such that the torque output by both respective motors is applied to the shaft; and in which the assembly further comprises a processor that generates an estimate of the position of the first motor using at least the signal output from the second motor position sensor and cross-checks the first motor position signal against the estimate of the motor position to determine if at least one of the motor position sensors is faulty;

wherein the method comprises the following steps performed in the order listed:

a) deciding that the shaft is not required to move for a short period of time;

b) applying a differential torque to the shaft using the first and second motors such that one motor applies a torque in a first sense and the other applies a torque of the opposite sense;

c) measuring the position of the first motor using the first motor position sensor and measuring the position of the second motor using the second motor position sensor with the differential torque applied;

d) ramping the differential torque applied by the first and second motors to the shaft from one polarity to the opposite polarity such that the first and second motors have moved fully across any backlash in their respective connections to the shaft, e) measuring the position of the first motor using the first motor position sensor and measuring the position of the second motor using the second motor position sensor with the opposite polarity differential torque applied; and f) confirming that the outputs of the two motor position sensors have changed by an expected amount according to the amount of backlash in each gearset.

20. The method of claim 19, further comprising, after steps a to f, the steps of:

g) ramping the differential torque back to the original polarity;

h) remeasuring the position of the first motor using the first motor position sensor and measuring the position of the second motor using the second motor position sensor; and i) confirming that the output from the two motor position sensors have returned to a predetermined range of original values measured in step (c) and if the output has not returned to the predetermined range of original values measured in step (c), initiate a flat that is indicative that a fault is present in one or both of the motor position sensors.

* * * * *